(12) United States Patent
Seethaler et al.

(10) Patent No.: US 11,551,634 B1
(45) Date of Patent: Jan. 10, 2023

(54) LIFE EXTENSION FOR PIXELS ASSOCIATED WITH A CAMERA UNDER DISPLAY

(71) Applicant: Lenovo (United States) Inc., Morrisville, NC (US)

(72) Inventors: Kenneth Scott Seethaler, Raleigh, NC (US); Kazuo Fujii, Yokohama (JP); Ngoc Huy Truong, Kawasaki (JP); Limin Xiao, Kanagawa-ken (JP)

(73) Assignee: Lenovo (United States) Inc., Morrisville, NC (US)

( * ) Notice: Subject to any disclaimer, the term of this patent is extended or adjusted under 35 U.S.C. 154(b) by 0 days.

(21) Appl. No.: 17/577,288

(22) Filed: Jan. 17, 2022

(51) Int. Cl.
| | |
|---|---|
| *G09G 5/00* | (2006.01) |
| *G06F 1/3231* | (2019.01) |
| *G06F 1/3234* | (2019.01) |
| *H04M 1/72463* | (2021.01) |
| *G09G 5/10* | (2006.01) |

(52) U.S. Cl.
CPC ........... *G09G 5/003* (2013.01); *G06F 1/3231* (2013.01); *G06F 1/3265* (2013.01); *G09G 5/10* (2013.01); *H04M 1/724631* (2022.02); *G09G 2320/0295* (2013.01); *G09G 2320/043* (2013.01); *G09G 2330/022* (2013.01); *G09G 2330/04* (2013.01)

(58) Field of Classification Search
CPC .................................................... G06F 1/3231
See application file for complete search history.

(56) References Cited

U.S. PATENT DOCUMENTS

| | | | |
|---|---|---|---|
| 2021/0272515 A1* | 9/2021 | Choi | G09G 3/3275 |
| 2022/0116546 A1* | 4/2022 | Gummadi | H04N 5/22525 |
| 2022/0147142 A1* | 5/2022 | Bui | G06V 40/171 |

* cited by examiner

*Primary Examiner* — Gustavo Polo
(74) *Attorney, Agent, or Firm* — Schwegman Lundberg & Woessner, P.A.

(57) ABSTRACT

A processor-based device with a display unit, such as a smart phone, identifies pixels associated with a camera under the display screen. The device also identifies a condition in which the pixels associated with the camera under the display screen can be dimmed or turned off. The device then dims or turns off the pixels associated with the camera under display based on the condition.

17 Claims, 4 Drawing Sheets

LIFE EXTENSION FOR PIXELS ASSOCIATED WITH A CAMERA UNDER DISPLAY

TECHNICAL FIELD

Embodiments described herein generally relate to the extension of pixel life for pixels on a processor-based display device, and in an embodiment, but not by way of limitation, the extension of pixel life for pixels associated with a camera under display of a processor-based display device.

BACKGROUND

Early and current processor-based display devices, such as the screen on a smart phone, are surrounded by a narrow outlining frame, and positioned in the frame is a camera that can be used for, among other things, the taking of selfie pictures. Newer model smart phones and other display devices are diminishing or removing the outlining frame, such that the display takes up almost the entire or the entire front face of the display device (and perhaps even going over onto the side edge of the smart phone). In these newer models, the camera for the taking of selfies must be placed behind the screen of the smart phone.

In order to place the camera behind the display screen, the pixels on the screen in front of the camera must be smaller than the pixels on the rest of the screen. These smaller pixels permit the transmission of light to the camera. Because these pixels are smaller, they are powered at a higher level than the other pixels so that they are brighter. This increased brightness compensates for the smaller pixel size, and therefore provides a more uniform display in that area of the camera so that the user experience is not negatively affected. However, providing more power to these pixels shortens the life of these pixels as compared to the remainder of the pixels in the display.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

To overcome the shortcomings of the shortened life of pixels that are associated with a camera under display, an embodiment turns off or decreases the power supplied to these pixels under certain conditions. This turning off or decreasing of the power to these pixels then extends the life of these pixels. However, the powering off or decreasing the power to these pixels is only executed under certain circumstances so as to not negatively affect the user experience.

The conditions wherein the pixels are dimmed or turned off so as to not negatively affect the user experience can include the following. When the user isn't looking at the screen, or when there is no user present in front of the screen. This can be determined via computer vision or some type of range finding technology. Another situation is when the screen of the smart phone is locked or in a saver state (but the smart phone is still powered on). Another situation when the pixels can be turned off or dimmed is when the area of the camera under display doesn't have an active program executing on it, and it is just displaying background images or other non-essential material.

In another embodiment, the entire edge of the smart phone screen is dimmed under one or more of the just-described conditions. The dimming of the entire edge of the screen makes it less obvious that the pixels associated with the camera under display have dimmed because the pixels that are associated with the camera under display will have dimmed at the same rate as the rest of the perimeter of the display. This can similarly be applied in cameras wherein the display goes "over the edge" and onto the side of the smart phone.

Figure 1:
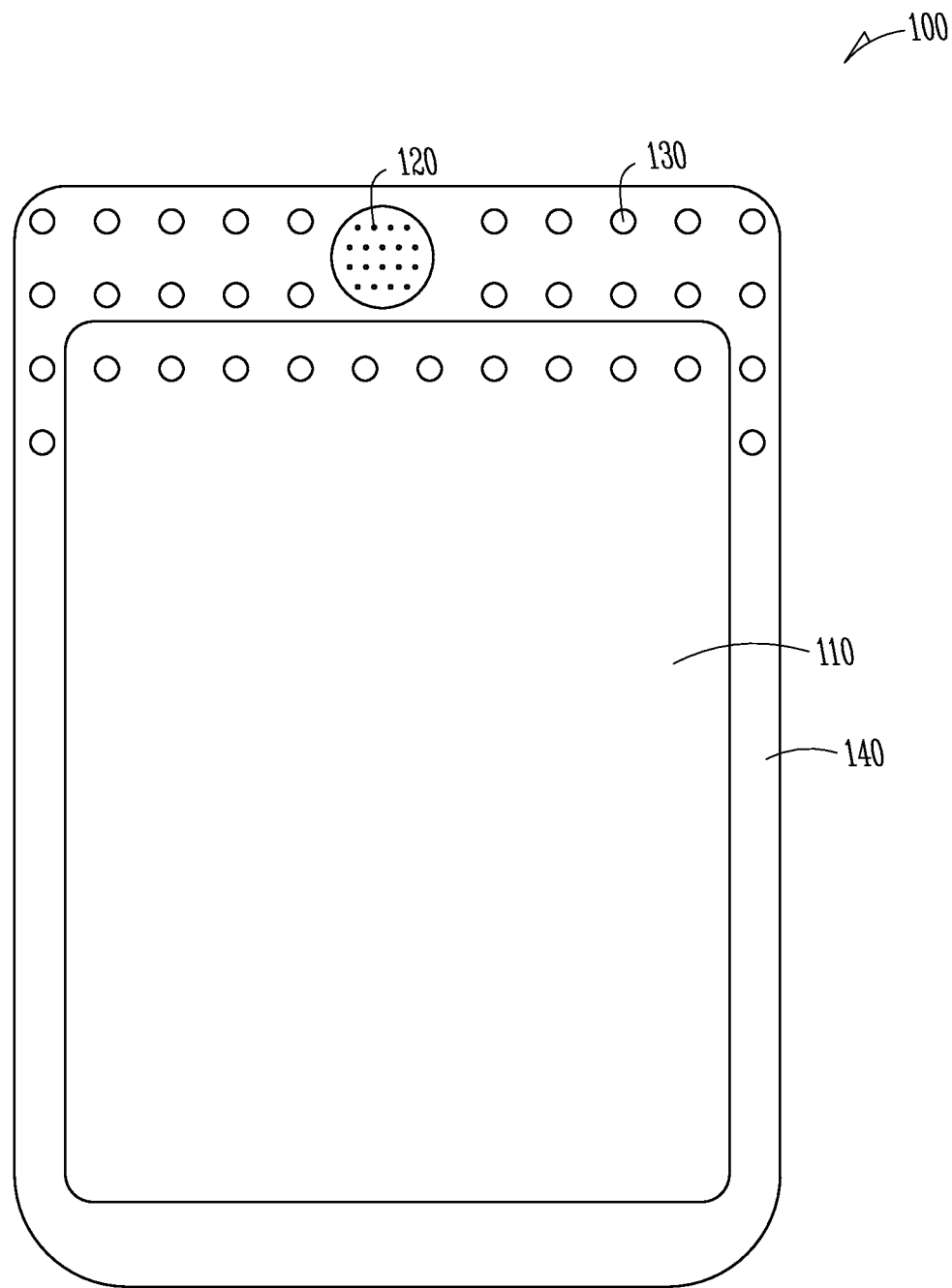
FIG. 1 illustrates a smart phone that includes a camera under the display screen.

FIG. 1 illustrates a smart phone 100 that includes a camera under the display. While FIG. 1 illustrates and discusses a smart phone, it should be understood that other processor-based display devices, such as a laptop computer or an iPad with a camera under display, could use the techniques disclosed herein. Referring to FIG. 1, the smart phone 100 includes a screen 110. The smart phone 100 further includes a camera under display (FIG. 2, no. 115; not illustrated in FIG. 1), and an area of pixels 120 that is positioned over the camera under display. As can be seen from FIG. 1, the pixels 120 associated with the camera under display are smaller than the pixels 130 that are associated with the rest of the screen of the smart phone 100. As previously noted, these smaller pixels allow the transmission of light to the camera under display.

Figure 2:
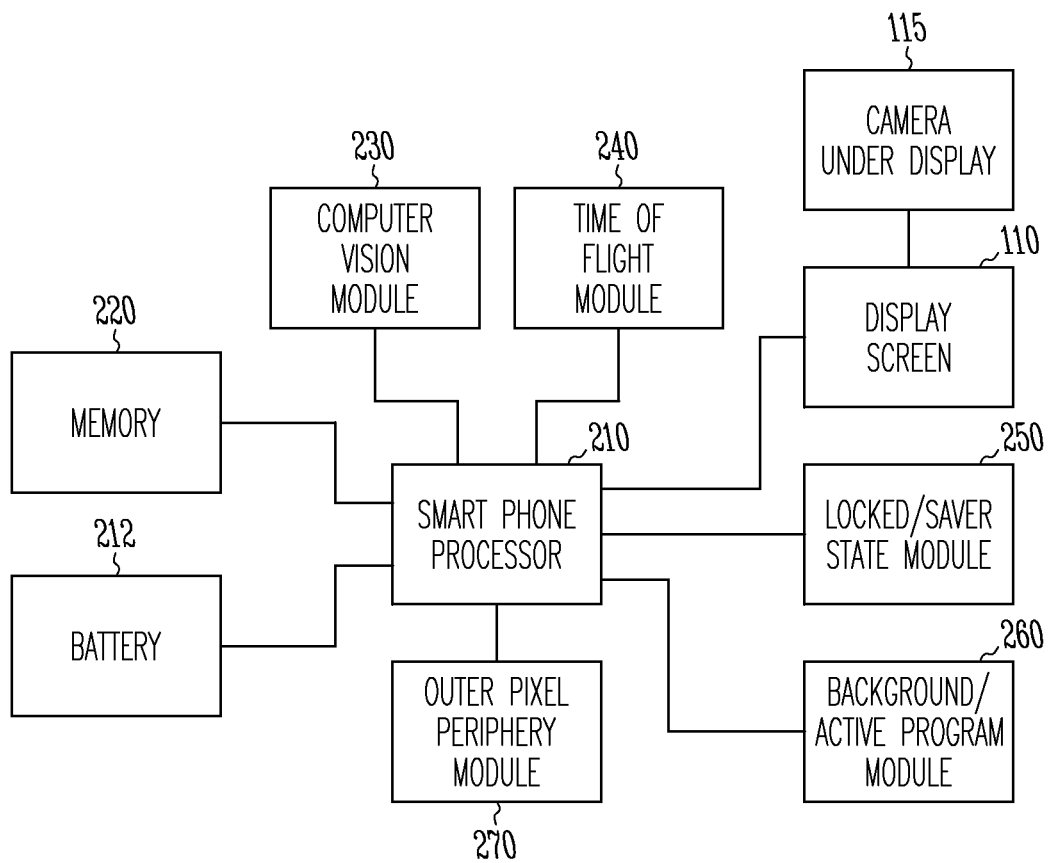
FIG. 2 is a circuit block diagram for a smart phone with a camera under display.
Figure 3A:
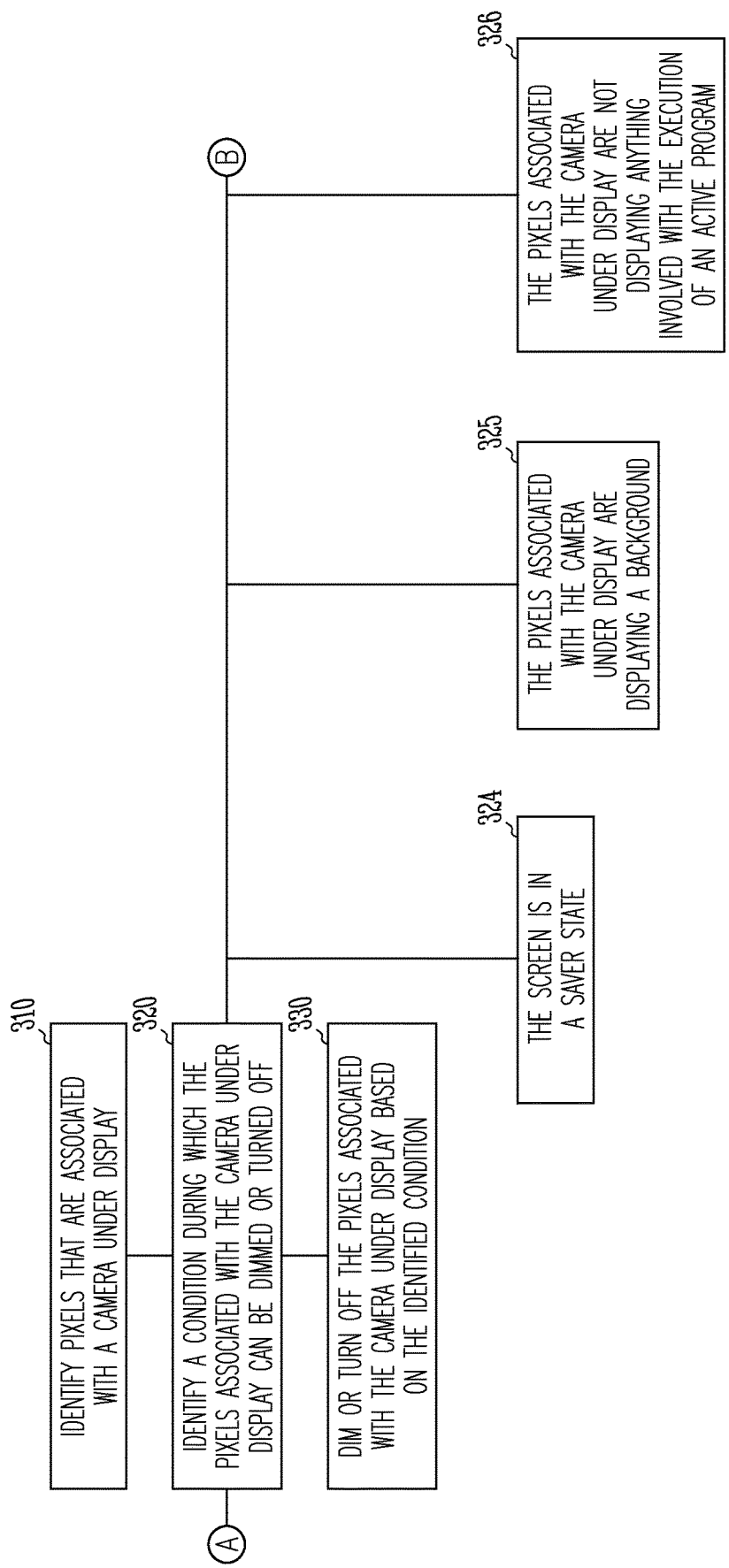
FIGS. 3A and 3B are a block diagram of operations and features associated with a smart phone having a camera under display.
Figure 3B:
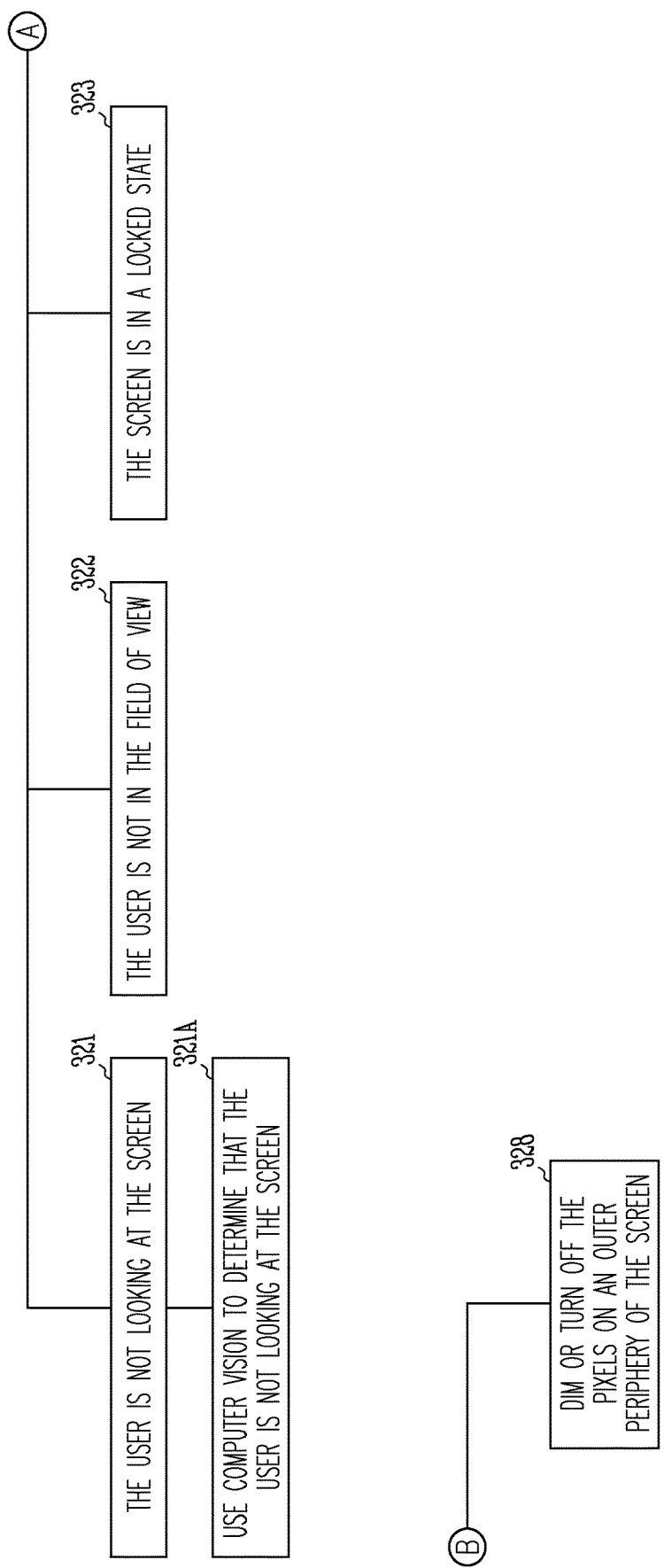

FIG. 2 is an example circuit block diagram for a smart phone (such as the smart phone 100 in FIG. 1) with a camera under display, and FIGS. 3A and 3B are a block diagram of operations and features associated with a smart phone (such as the smart phone 100 in FIG. 1) having a camera under display.

Referring first to FIGS. 3A and 3B, at 310 pixels are identified that are associated with a camera under display on a processor-based display device such as the smart phone 100 in FIG. 1. These pixels and their locations can be identified in one or more ways. For example, the locations of these pixels could simply be stored in a file in the memory 220 of the smart phone. At 320, a condition is identified during which the pixels associated with the camera under display can be dimmed or turned off. These conditions can be identified with the use of certain software or firmware modules as is discussed in more detail below in connection with each of the conditions. At 330, the pixels associated with the camera under display are dimmed or turned off as a function of the identified condition.

As indicated at 321, a condition under which the pixels associated with the camera under display can be dimmed or turned off is when the user of the smart phone is not looking at the screen of the smart phone. As further indicated at 321A, it can be determined that the user is not looking at the screen of the smart phone using computer vision techniques. For example, the computer vision logic could be such that the side profile of a user's face is detected (via the curve of the user's nose and lips for example). If the user's head is turned such that the computer vision identifies the side profile, then the user is not looking at the screen of the processor-based display device. The software, firmware, and/or hardware associated with this function can be located in the computer vision module 230 of FIG. 2. The module 230 is executed by the smart phone processor 210, which can be powered by a battery 212.

As indicated at 322, the condition under which the pixels associated with the camera under display can be dimmed or turned off is when the user is not in the field of view of the camera under display. Like with the determination that the user is not looking at the screen in operation 321, this determination of operation 322 can be made using computer vision techniques. The determination can also be made using other techniques like radar and time-of-flight techniques, and using software, firmware, and hardware of the time-of-flight module 240 in FIG. 2.

As indicated at 323, another condition under which the pixels associated with the camera under display can be dimmed or turned off is when the screen of the smart phone is in a locked state (but still on), or as indicated at 324, when the screen of the smart phone is in a saver state (but still on). The software, firmware, and/or hardware associated with this function can be located in the locked/saver state module 250 of FIG. 2.

As indicated at 325, the condition under which the pixels associated with the camera under display can be dimmed or turned off is when the pixels associated with the camera under display are displaying a background, and/or as indicated at 326 the pixels associated with the camera under display are not displaying anything involved with the execution of an active program. The software, firmware, and/or hardware associated with this function can be located in the background/active program module 260 of FIG. 2. The background/active program module 260 can be part of the operating system or it can be instantiated in an application program interface (API).

In another embodiment, as indicated at 328, when any of the conditions noted in operations 321-326 are present, the pixels on an outer periphery 140 of the screen of the smart phone 100 can be dimmed or turned off. The identity and/or the locations of these outer pixels can be stored in a file in the memory 220 of the smart phone. When the outer pixels of the screen are dimmed, it is then less noticeable to the user and affects the user experience to a lesser degree than when the pixels of only the camera under display are dimmed or turned off. The software, firmware, and/or hardware associated with this function can be located in the outer pixel periphery module 270 of FIG. 2.

EXAMPLES

Example No. 1 is a process that includes identifying pixels associated with a camera under display on a processor-based display device; identifying a condition in which the pixels associated with the camera under display can be dimmed or turned off; and dimming or turning off the pixels associated with the camera under display as a function of the condition.

Example No. 2 includes the features of Example No. 1, and optionally includes wherein the condition comprises a user who is not looking at a screen of the processor-based display device.

Example No. 3 includes the features of Example Nos. 1-2, and optionally includes using computer vision to determine that the user is not looking at the screen of the processor-based display device.

Example No. 4 includes the features of Example Nos. 1-3, and optionally includes wherein the condition comprises a user not being in a field of view of the camera under display.

Example No. 5 includes the features of Example Nos. 1-4, and optionally includes wherein the condition comprises a screen of the processor-based display device being in a locked state.

Example No. 6 includes the features of Example Nos. 1-5, and optionally includes wherein the condition comprises a screen of the processor-based display device being in a saver state.

Example No. 7 includes the features of Example Nos. 1-6, and optionally includes wherein the condition comprises the pixels associated with the camera under display displaying a background.

Example No. 8 includes the features of Example Nos. 1-7, and optionally includes wherein the condition comprises the pixels associated with the camera under display not being associated with an active program execution.

Example No. 9 includes the features of Example Nos. 1-8, and optionally includes dimming or turning off pixels on an outer periphery of a screen of the processor-based display device as a function of the condition.

Example No. 10 includes the features of Example Nos. 1-9, and optionally includes wherein the processor-based display device comprises a smart phone.

Example No. 11 is a machine-readable medium comprising instructions that when executed by a processor executes a process comprising identifying pixels associated with a camera under display on a processor-based display device; identifying a condition in which the pixels associated with the camera under display can be dimmed or turned off; and dimming or turning off the pixels associated with the camera under display as a function of the condition.

Example No. 12 includes the features of Example No. 11, and optionally includes wherein the condition comprises a user who is not looking at a screen of the processor-based display device; and using computer vision to determine that the user is not looking at the screen of the processor-based display device.

Example No. 13 includes the features of Example Nos. 11-12, and optionally includes wherein the condition comprises a user not being in a field of view of the camera under display.

Example No. 14 includes the features of Example Nos. 11-13, and optionally includes wherein the condition comprises a screen of the processor-based display device being in a locked state.

Example No. 15 includes the features of Example Nos. 11-14, and optionally includes wherein the condition comprises a screen of the processor-based display device being in a saver state.

Example No. 16 includes the features of Example Nos. 11-15, and optionally includes wherein the condition comprises the pixels associated with the camera under display displaying a background.

Example No. 17 includes the features of Example Nos. 11-16, and optionally includes wherein the condition comprises the pixels associated with the camera under display not being associated with an active program execution.

Example No. 18 includes the features of Example Nos. 11-17, and optionally includes dimming or turning off pixels on an outer periphery of a screen of the processor-based display device as a function of the condition.

Example No. 19 includes the features of Example Nos. 11-18, and optionally includes wherein the processor-based display device comprises a smart phone.

Example No. 20 is a system comprising a computer processor; a computer memory coupled to the computer processor; a computer display device coupled to the computer processor; and a camera located behind the computer display device; wherein the computer processor, the computer memory, the camera, and the computer display device are configured for identifying pixels associated with the camera; identifying a condition in which the pixels associated with the camera can be dimmed or turned off; and dimming or turning off the pixels associated with the camera as a function of the condition.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A process comprising:
identifying pixels associated with a camera under display on a processor-based display device;
identifying a condition in which the pixels associated with the camera under display can be dimmed or turned off; and
dimming or turning off the pixels associated with the camera under display as a function of the condition;
wherein the condition comprises a user who is not looking at a screen of the processor-based display device or the condition comprises a user not being in a field of view of the camera under display.

2. The process of claim 1, comprising using computer vision to determine that the user is not looking at the screen of the processor-based display device.

3. The process of claim 1, wherein the condition comprises a screen of the processor-based display device being in a locked state.

4. The process of claim 1, wherein the condition comprises a screen of the processor-based display device being in a saver state.

5. The process of claim 1, wherein the condition comprises the pixels associated with the camera under display displaying a background.

6. The process of claim 1, wherein the condition comprises the pixels associated with the camera under display not being associated with an active program execution.

7. The process of claim 1, comprising dimming or turning off pixels on an outer periphery of a screen of the processor-based display device as a function of the condition.

8. The process of claim 1, wherein the processor-based display device comprises a smart phone.

9. A non-transitory machine-readable medium comprising instructions that when executed by a processor executes a process comprising:
identifying pixels associated with a camera under display on a processor-based display device;
identifying a condition in which the pixels associated with the camera under display can be dimmed or turned off; and
dimming or turning off the pixels associated with the camera under display as a function of the condition;
wherein the condition comprises a user who is not looking at a screen of the processor-based display device or the condition comprises a user not being in a field of view of the camera under display.

10. The non-transitory machine-readable medium of claim 9, comprising using computer vision to determine that the user is not looking at the screen of the processor-based display device.

11. The non-transitory machine-readable medium of claim 9, wherein the condition comprises a screen of the processor-based display device being in a locked state.

12. The non-transitory machine-readable medium of claim 9, wherein the condition comprises a screen of the processor-based display device being in a saver state.

13. The non-transitory machine-readable medium of claim 9, wherein the condition comprises the pixels associated with the camera under display displaying a background.

14. The non-transitory machine-readable medium of claim 9, wherein the condition comprises the pixels associated with the camera under display not being associated with an active program execution.

15. The non-transitory machine-readable medium of claim 9, comprising dimming or turning off pixels on an outer periphery of a screen of the processor-based display device as a function of the condition.

16. The non-transitory machine-readable medium of claim 9, wherein the processor-based display device comprises a smart phone.

17. A system comprising:
- a computer processor:
- a computer memory coupled to the computer processor;
- a computer display device coupled to the computer processor; and
- a camera located behind the computer display device;
- wherein the computer processor, the computer memory, the camera, and the computer display device are configured for:
  - identifying pixels associated with the camera;
  - identifying a condition in which the pixels associated with the camera can be dimmed or turned off; and
- dimming or turning off the pixels associated with the camera as a function of the condition;
  - wherein the condition comprises a user who is not looking at a screen of the processor-based display device or the condition comprises a user not being in a field of view of the camera under display.

* * * * *